United States Patent
Song et al.

(10) Patent No.: US 7,567,323 B2
(45) Date of Patent: Jul. 28, 2009

(54) VERTICALLY ALIGNED MODE LIQUID CRYSTAL DISPLAY

(75) Inventors: Jang-Kun Song, Seoul (KR);
Kyeong-Hyeon Kim, Suwon (KR);
Jae-Jin Lyu, Kyungki-do (KR);
Eun-Hee Han, Seoul (KR);
Seung-Beom Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 369 days.

(21) Appl. No.: 11/141,823

(22) Filed: Jun. 1, 2005

(65) Prior Publication Data

US 2005/0275763 A1 Dec. 15, 2005

Related U.S. Application Data

(62) Division of application No. 10/363,227, filed as application No. PCT/KR02/01265 on Jul. 4, 2002, now Pat. No. 6,917,410.

(30) Foreign Application Priority Data

Jul. 5, 2001 (KR) .............................. 2001-39912

(51) Int. Cl.
*G02F 1/1337* (2006.01)
(52) U.S. Cl. ...................................... 349/130
(58) Field of Classification Search ................. 349/130
See application file for complete search history.

(56) References Cited

U.S. PATENT DOCUMENTS 6,141,075 A * 10/2000 Ohmuro et al. ............. 349/130
6,927,824 B1 * 8/2005 Takeda et al. ............... 349/129

FOREIGN PATENT DOCUMENTS

| JP | 06-308537 | 11/1994 |
|---|---|---|
| JP | 08-043825 | 2/1996 |
| JP | 10-111513 | 4/1998 |
| JP | 11-190861 | 7/1999 |
| JP | 2001-109009 | 4/2001 |
| JP | 2002-040432 | 2/2002 |
| KR | 1999-0006951 | 1/1999 |
| KR | 1999-0037218 | 5/1999 |
| KR | 1020010004524 | 1/2001 |
| KR | 1020010039259 | 5/2001 |

OTHER PUBLICATIONS

International Search Report from corresponding International Application No. PCT/KR02/01265.

* cited by examiner

*Primary Examiner*—James A Dudek
(74) *Attorney, Agent, or Firm*—F. Chau & Associates, LLC (57) ABSTRACT

Liquid crystal material is interposed between an upper panel and a lower panel. The lower panel includes signal transmitting wires including a gate wire and a data wire, thin film transistors connected to the signal transmitting wires and pixel electrodes connected to the thin film transistors, and the upper panel includes color filters, a black matrix and a common electrode. The pixel electrodes and the common electrode have apertures partitioning the pixel electrode into several domains. In addition, the director of liquid crystal molecules contained in the liquid crystal material is aligned perpendicular to the upper panel and the lower panel in absence of electric field between the pixel electrodes and the common electrode. The dielectric anisotropy of the liquid crystal material has a value ranging −4.0 to −5.5.

7 Claims, 10 Drawing Sheets

VERTICALLY ALIGNED MODE LIQUID CRYSTAL DISPLAY

CROSS-REFERENCE TO RELATED APPLICATION

This application is a Divisional of U.S. application Ser. No. 10/363,227, filed Jun. 6, 2003 now U.S. Pat No. 6,917,410, which claims priority to Korean Application No. 2001-39912 filed on Jul. 5, 2001 and International Application PCT/KR02/01265, filed on Jul. 4, 2002.

BACKGROUND OF THE INVENTION (a) Field of the Invention

The present invention relates to a liquid crystal display, and in particular, to a vertically aligned mode liquid crystal display with a pixel region divided into several domains for obtaining a wide viewing angle.

(b) Description of the Related Art

A typical liquid crystal display ("LCD") includes an upper panel provided with a common electrode and an array of color filters, a lower panel provided with a plurality of thin film transistors ("TFTs) and a plurality of pixel electrodes, and a liquid crystal layer is interposed therebetween. The pixel electrodes and the common electrode are applied with electric voltages and the voltage difference therebetween causes electric field. The variation of the electric field changes the orientations of liquid crystal molecules in the liquid crystal layer and thus the transmittance of light passing through the liquid crystal layer. As a result, the LCD displays desired images by adjusting the voltage difference between the pixel electrodes and the common electrode.

The LCD has a major disadvantage of its narrow viewing angle, and several techniques for increasing the viewing angle have been developed. Among these techniques, the provision of aperture patterns or a plurality of projections on the pixel electrodes and the common electrode opposite each other along with the vertical alignment of the liquid crystal molecules with respect to the upper and the lower panels is promising.

The aperture patterns provided both at the pixel electrodes and the common electrode give wide viewing angle by generating fringe field to adjust the tilt directions of the liquid crystal molecules.

The provision of the projections both on the pixel electrode and the common electrode distorts the electric field to adjust the tilt directions of the liquid crystal molecules.

The fringe field for adjusting the tilt directions of the liquid crystal molecules to form a plurality of domains is also obtained by providing the aperture patterns at the pixel electrodes and the projections on the common electrodes.

Such a vertically aligned ("VA") mode LCD needs higher driving voltages than a twisted nematic ("TN") mode LCD where the liquid crystal molecules have twisted alignment. In detail, the magnitude of the analogue driving voltage AVdd required for the TN mode LCD is equal to or less than 9V, while the driving voltage AVdd for the VA mode LCD is in a range between 10V and 13V. Thus, the TN mode LCD can use 10V tape carrier package ("TAP") integrated circuits ("ICs") as driving ICs, while the VA mode LCD is obliged to use 13V TAP ICs or 15V TAP ICs. The expensive price of the 13V TAP ICs or the 15V TAP ICs relative to the 10V TAP ICs weakens the price competitiveness.

SUMMARY OF THE INVENTION

An object of the present invention is to decrease driving voltages of a vertically aligned mode liquid crystal display.

To accomplish such an object, the present invention employs a liquid crystal material having dielectric anisotropy equal to or less than −4.0.

In detail, a liquid crystal display is provided, which includes: a first insulating substrate; a plurality of first signal lines formed on the first insulating substrate; a plurality of second signal lines formed on the first insulating substrate and insulated from and intersecting the first signal lines; a pixel electrode formed on a pixel area defined by intersections of the first signal lines and the second signal lines; a tin film transistor connected to one of the first signal lines, one of the second signal lines and the pixel electrode; a second insulating substrate opposite to the first insulating substrate; a common electrode formed on the second insulating substrate; and a liquid crystal material interposed between the first insulating substrate and the second insulating substrate, wherein liquid crystal molecules contained in the liquid crystal material are aligned substantially parallel to the first and the second substrates in absence of electric field between the pixel electrode and the common electrode, and dielectric anisotropy of the liquid crystal material is in a range of −4.0 to −5.5.

It is preferable that the dielectric anisotropy of the liquid crystal material is in a range of −4.5 to −5.0.

The liquid crystal display may further include a plurality of domain partitioning members formed on the first insulating substrate and the second insulating substrate for partitioning the pixel area into a plurality of domains. The domain partitioning members include either a combination of an aperture pattern provided at the pixel electrode and a dielectric projection provided on the second insulating substrate, or a pair of aperture patterns provided on the pixel electrode and the common electrode.

The domains partitioned by the domain partitioning members are classified into longitudinally long domains and transversely long domains, and the transversely long domains may occupy areas larger than the longitudinally long domains. In addition, it is preferable that distance between two adjacent second signal lines is periodically varied by unit of a predetermined length, and an edge of the pixel electrode adjacent to the second signal lines is curved along the second signal lines such that the pixel electrode may have a narrow portion and a wide portion.

DETAILED DESCRIPTION OF PREFERRED EMBODIMENTS

A vertically aligned mode LCD according to embodiments of the present invention will be described with reference to the drawings.

Figure 1:
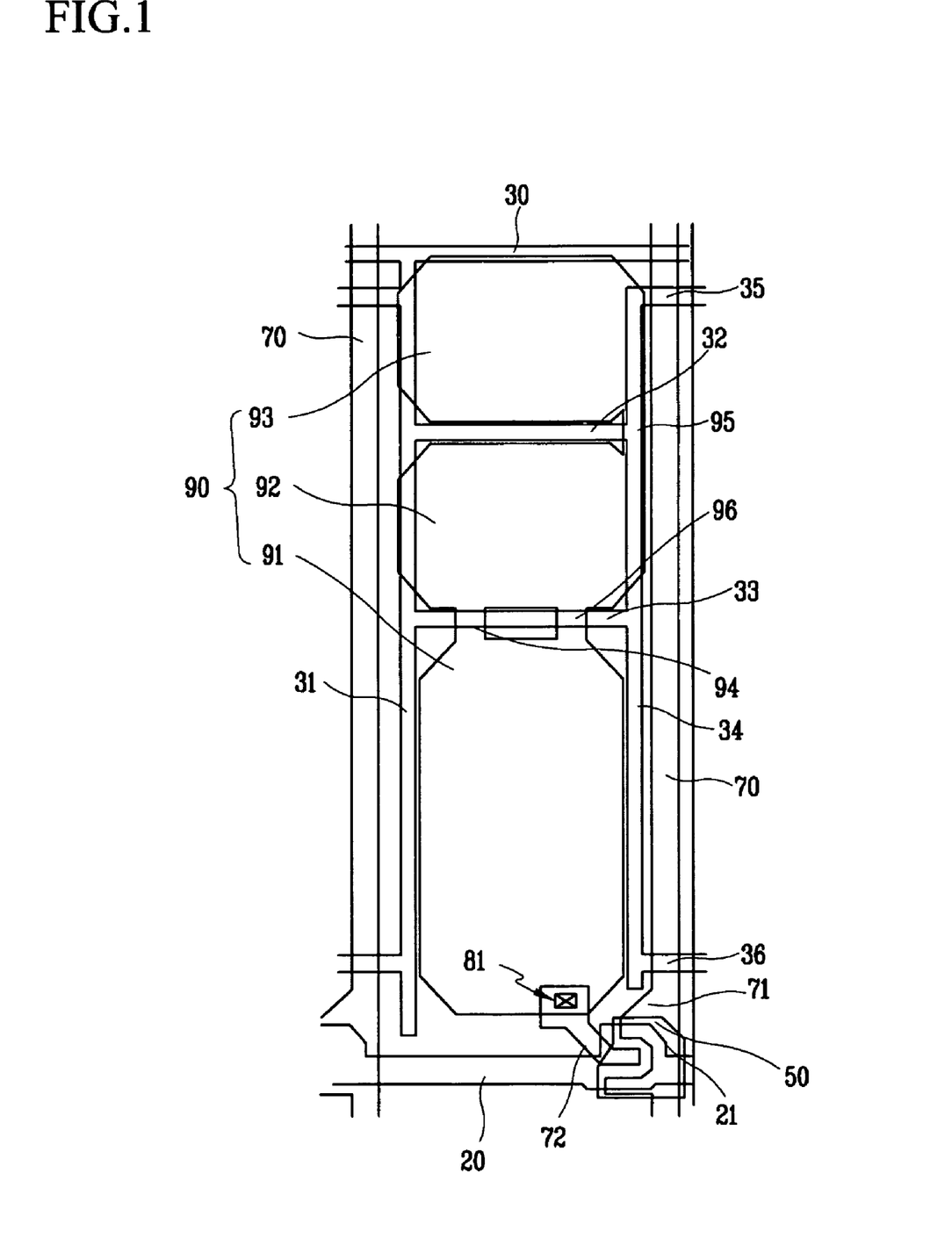
FIG. 1 is a layout view of a TFT array panel for an LCD according to a first embodiment of the present invention.
Figure 2:
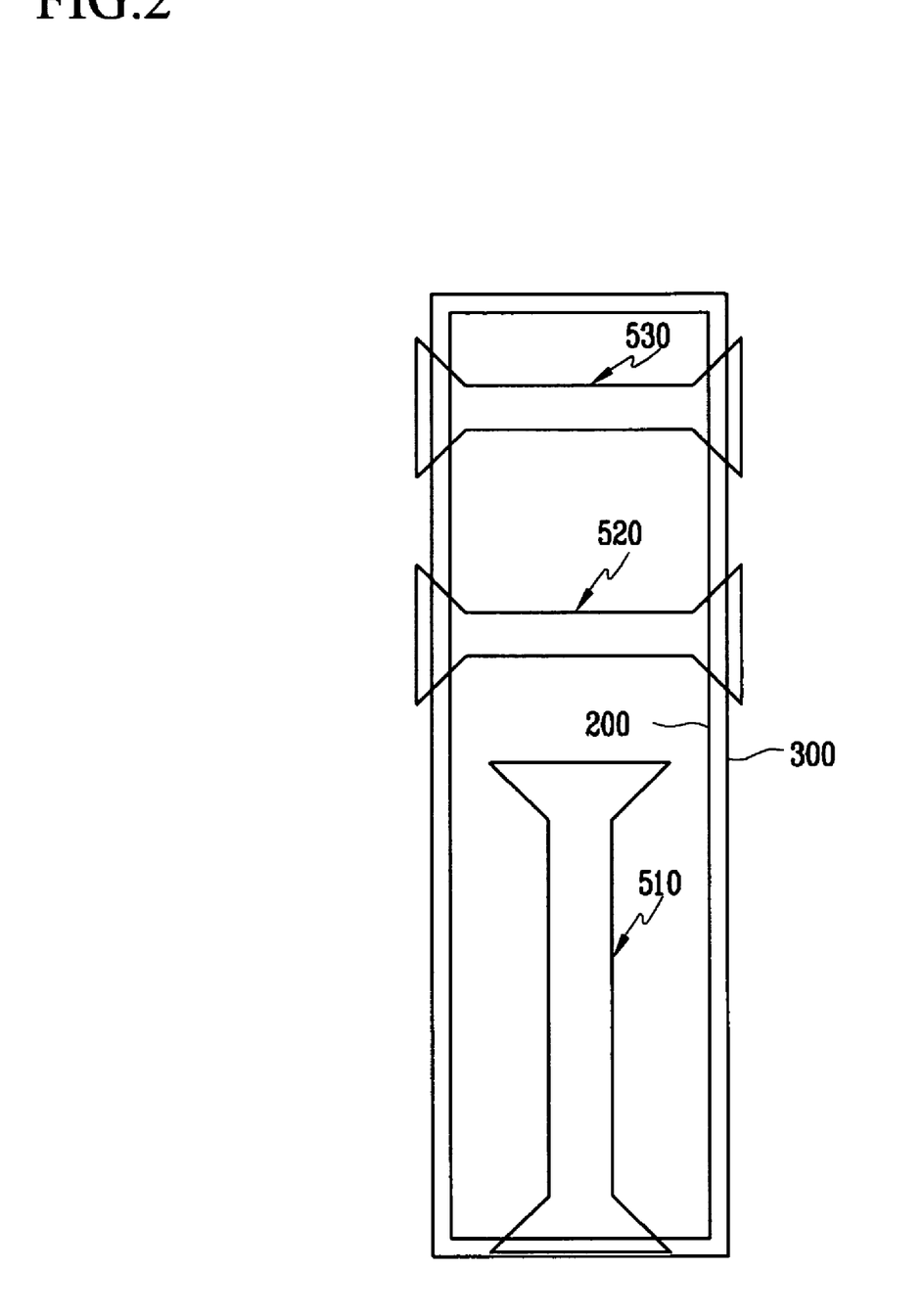
FIG. 2 is a layout view of apertures provided at a common electrode of an LCD according to the first embodiment of the present invention.
Figure 3:
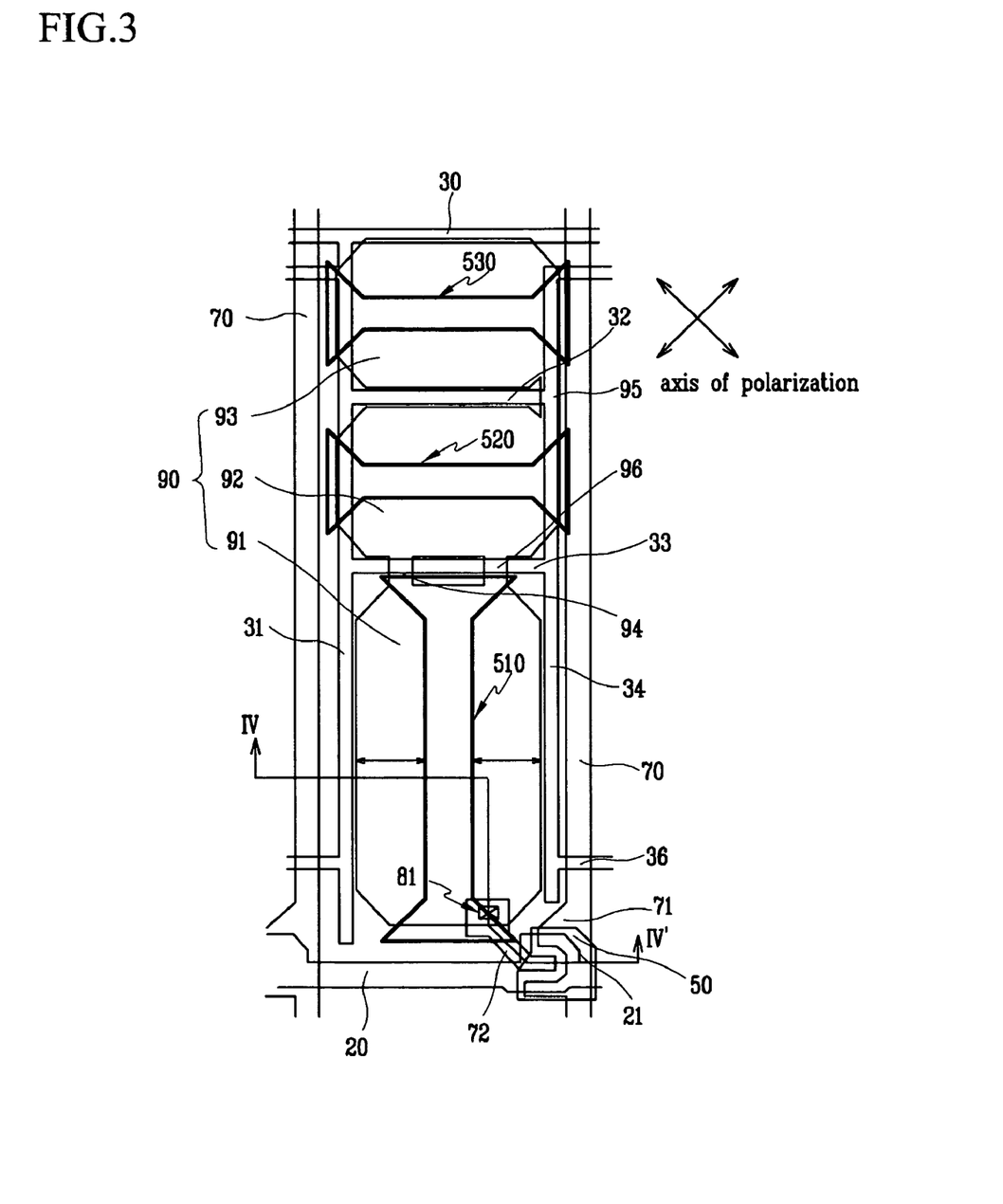
FIG. 3 is a front layout view of a pixel electrode and a common electrode of an LCD according to the first embodiment of the present invention.
Figure 4:
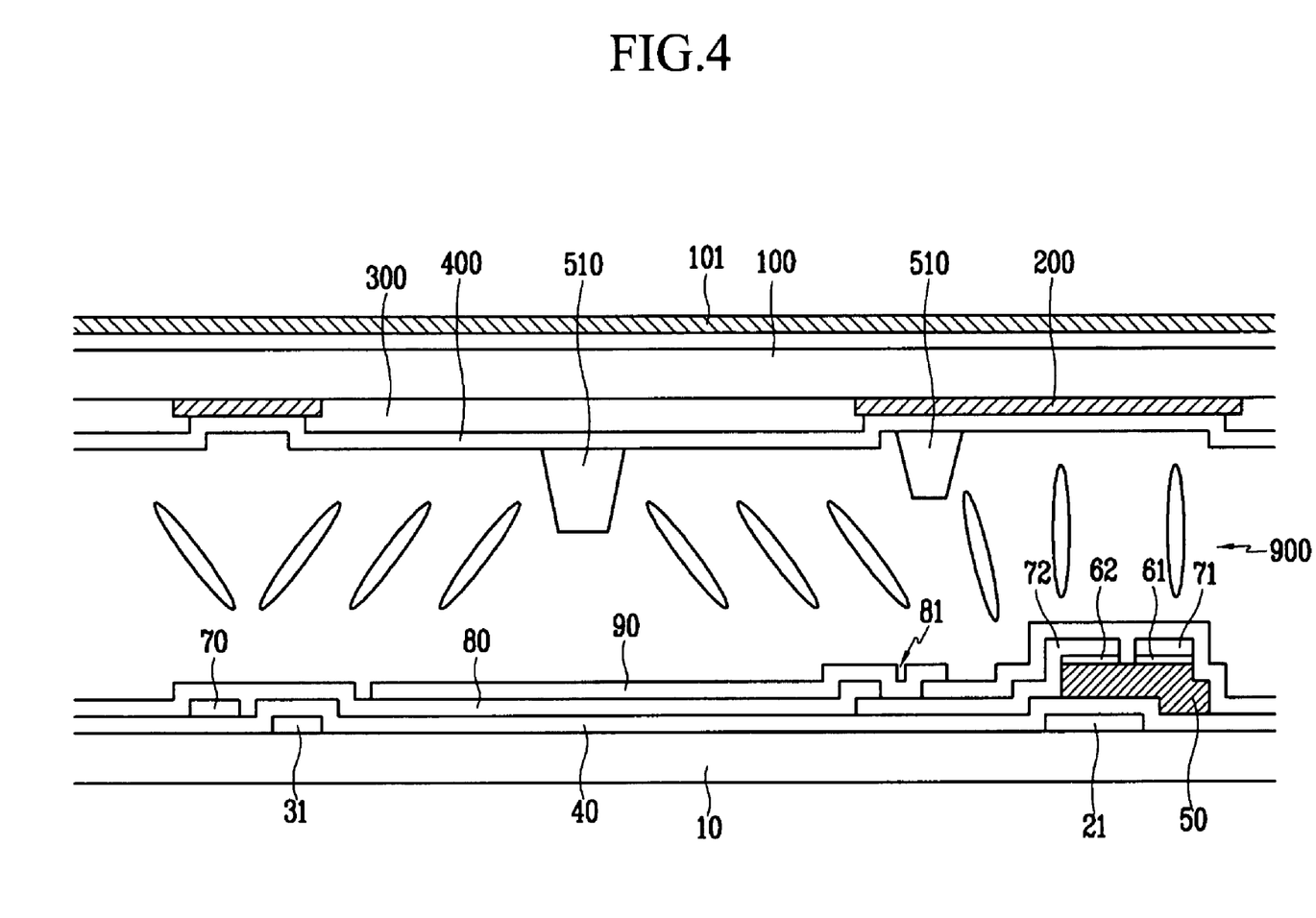
FIG. 4 is a sectional view taken along line IV-IV' shown in FIG. 3.

FIG. 1 is a layout view of a TFT array panel for an LCD according to a first embodiment of the present invention, FIG. 2 is a layout view of apertures provided at a common electrode of an LCD according to the first embodiment of the present invention, FIG. 3 is a front layout view of a pixel electrode and a common electrode of an LCD according to the first embodiment of the present invention, and FIG. 4 is a sectional view taken along line IV-IV' shown in FIG. 3.

First, referring to FIGS. 1 and 4, a TFT array panel for an LCD according to a first embodiment will be described.

A plurality of gate lines 20 extending in a transverse direction and a plurality of storage capacitor lines 30 substantially parallel to the gate lines 20 are formed on an insulating substrate 10 preferably made of transparent glass. A plurality of gate electrodes 21 are projected from each gate line 20, and a plurality of sets of first to fourth storage electrodes 31-34 and two storage electrode connections 35 and 36 are branched from and connected to each storage capacitor line 30. The first storage electrode 31 is directly connected to the storage capacitor line 30 and extends in a longitudinal direction, and the second and the third storage electrodes 32 and 33 are connected to the first storage electrode 31 and extend in the transverse direction. The fourth storage electrode 34 is connected to the second and the third storage electrodes 32 and 33 and extends in the longitudinal direction. The storage electrode connections 35 and 36 connect the fourth storage electrode 34 to the first storage electrode 31 of a neighboring pixel. A gate insulating layer 40 is formed on a gate wire 20 and 21 and the storage capacitor wire 30-36, and a semiconductor layer 50 preferably made of amorphous silicon is formed on the gate insulating layer 40. A contact layer 61 and 62 preferably made of amorphous silicon heavily doped with N type impurity such as P is formed on the semiconductor layer 50. A plurality of pairs of a source electrode 71 and a drain electrode 72 are formed on respective portions of the contact layer 61 and 62, and the source electrodes 71 are connected to a plurality of data lines 70 extending in the longitudinal direction and located on the gate insulating layer 40. A passivation layer 80 having a plurality of contact holes 81 exposing the drain electrodes 72 is formed on the data wire 70-72, and a plurality of pixel electrodes 90 connected to the drain electrodes 72 through the contact holes 81 are formed on the passivation layer 80. The pixel electrodes 90 are preferably made of a transparent conducting material such as indium tin oxide ("ITO") or indium zinc oxide ("IZO").

Each pixel electrode 90 is divided into first to third partitions 91-93, and these partitions 91-93 are connected to one another through a plurality of connections 94-96. The first partition 91 has a rectangular shape with four chamfers and located in a lower half of a pixel area defined by the intersections of two gate lines 20 and two data lines 70. The first partition 91 is directly connected to the drain electrode 72 through the contact hole 81. Each of the second and the third partitions 92 and 93 has also a rectangular shape with four chamfers and located in an upper half of the pixel area. The second partition 92 is connected to the first partition 91 through first and second connections 94 and 96, and the third partition 93 is connected to the second partition 92 through a third connection 95. Here, the second storage electrode 32 is disposed between the first partition 91 and the second partition 92, the third storage electrode 33 is disposed between the second partition 92 and the third partition 93, and the first and the fourth storage electrodes 31 and 34 are disposed between the pixel electrode 90 and the data line 70. The edges of the first partition 91 parallel to the data lines 70 are longer than the edges parallel to the gate line 20, while the edges of the second and the third partitions 92 and 93 parallel to the data lines 70 are shorter than the edges parallel to the gate line 20. The second and the third partitions 92 and 93 overlap the first and the fourth storage electrodes 31 and 34, while the first partition 91 do not overlap them. The storage capacitor line 30 is disposed between the gate line 20 and the third partition 93. It is common that the storage capacitor line 30, the storage electrodes 31-34 and the storage connections 35 and 36 are applied with voltages to be applied to a common electrode of a color filter panel, which will be described later.

The storage capacitor line or the storage electrodes applied with a common voltage disposed between the data line and the pixel electrode and between the gate line and the pixel electrode block the influence of the voltages of the data line and the gate line on the electric field in a pixel region, thereby making domains to be stable.

Next, referring to FIGS. 2 and 4, a color filter panel of an LCD according to the first embodiment of the present invention will be described.

A black matrix 200 preferably including double layers of Cr and CrOx is formed on a transparent substrate 100 preferably made of glass. The black matrix 200 defines a plurality of pixel areas. A plurality of color filters 300 are formed in the respective pixel areas, and a common electrode 400 preferably made of a transparent conductor is formed on the color filters 300. A plurality of patterns of projections 510-530 preferably made of a dielectric with dielectric constant different from that of the liquid crystal material 900 are formed on the common electrode 400. Each projection pattern 510, 520 and 530 includes first to third projections 510-530. The first projection 510 bisects a lower half of a pixel area in the transverse direction, while the second and the third projections 520 and 530 trisect an upper half of the pixel area in the longitudinal direction. Both ends of the each projection 510, 520 or 530 are gradually enlarged to form isosceles triangles, and the projections 510-530 are separated from one another.

The black matrix 200 may be made of an organic material, and the color filters may be provided on the TFT array panel.

Now, an LCD according to the first embodiment of the present invention will be described with reference to FIGS. 3 and 4.

First, an LCD according to the first embodiment of the present invention is prepared by aligning and combining the TFT array panel shown in FIG. 1 and the color filter panel shown in FIG. 2, injecting the liquid crystal material 900 into a gap between the panels such that the director of the liquid crystal molecules contained therein is aligned in a vertical direction, and adding two polarizers 11 and 101 on the outer surfaces of the substrates 10 and 100 such that the polarization axes of the two polarizers 11 and 101 are perpendicular to each other.

After aligning the two substrates 10 and 100, the partitions 91-93 of each pixel electrode 90 in the TFT array panel and the first to the third projections 510-530 on the common electrode 400 in the color filter panel overlap to partition a pixel area into several subareas. Each partition 91-93 of the pixel electrode 90 includes two long edges and two short edges, and the long edges of each partition 91-93 are parallel to the data lines 70 or the gate lines 20 and make 45 degrees with the polarization axes of the polarizers 11 and 101 (as shown in FIG. 3). Here, when the long edges of each partition 91-93 are close to the data lines 70 and the gate lines 20, the storage capacitor line 30 or the storage electrodes 31-34 are disposed between the data lines 70 and the long edges and between the gate lines 20 and the long edges. Meanwhile, the storage capacitor wire 30-34 is not disposed near the short edges of the partitions 91-93, or alternately, if disposed so, they are preferably completely covered with the pixel electrode 80 or spaced apart from the pixel electrode 90 by 3 microns or more. The reason for the above described disposal of the storage capacitor wire 30-34 is that the potentials of the data lines 70 and the gate lines 20 close to the long edges of the partitions 91-93 hinder the formation of domains, while those close to the short edges of the partitions 91-93 enhances the formation of the domains. The dielectric anisotropy $\Delta\in$ of the liquid crystal material 900 has a value in a range between $-4.0$ and $-5.5$, and it is much preferable that the value of the dielectric anisotropy $\Delta\in$ ranges $-4.5$ to $-5.5$ since a V10 voltage (which indicates a voltage making the transmittance to be 10% of the maximum transmittance) can be decreased to 2.2V or lower.

Figure 5:
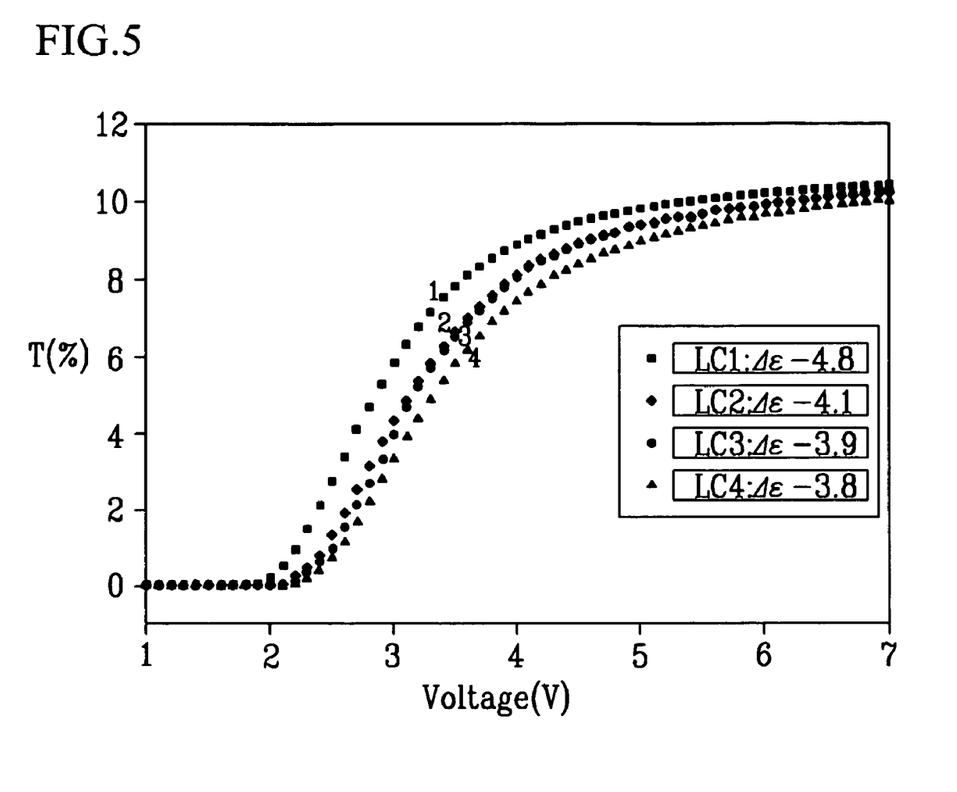
FIG. 5 is a graph showing the variation of the voltage-transmittance ("V-T") curves depending on the dielectric anisotropy of liquid crystal materials.

Now, the reason for the preference of the dielectric anisotropy of the liquid crystal material 900 in a range between $-4.0$ and $-5.5$ will be described with reference to FIGS. 5 and 6. FIG. 5 is a graph showing the variation of the voltage-transmittance ("V-T") curves depending on the dielectric anisotropy of the liquid crystal material 900, and FIG. 6 is a graph showing a V10 voltage as function of the dielectric anisotropy of the liquid crystal material 900.

As shown in FIG. 5, the larger the dielectric anisotropy becomes, the more rapidly the V-T curve rises. Therefore, the voltage giving the maximum transmittance decreases as the dielectric anisotropy increases. The curve represented by numeral 4 is one for a conventional liquid crystal corresponding to LC4 having the dielectric anisotropy of about $-3.8$. LC4, as shown in FIG. 5, is suitable for 5.5V driving (i.e., 11V in view of AVdd), but not suitable for 4.5V driving (i.e., 9V in view of AVdd) due to the drastic decrease of the transmittance.

Figure 6:
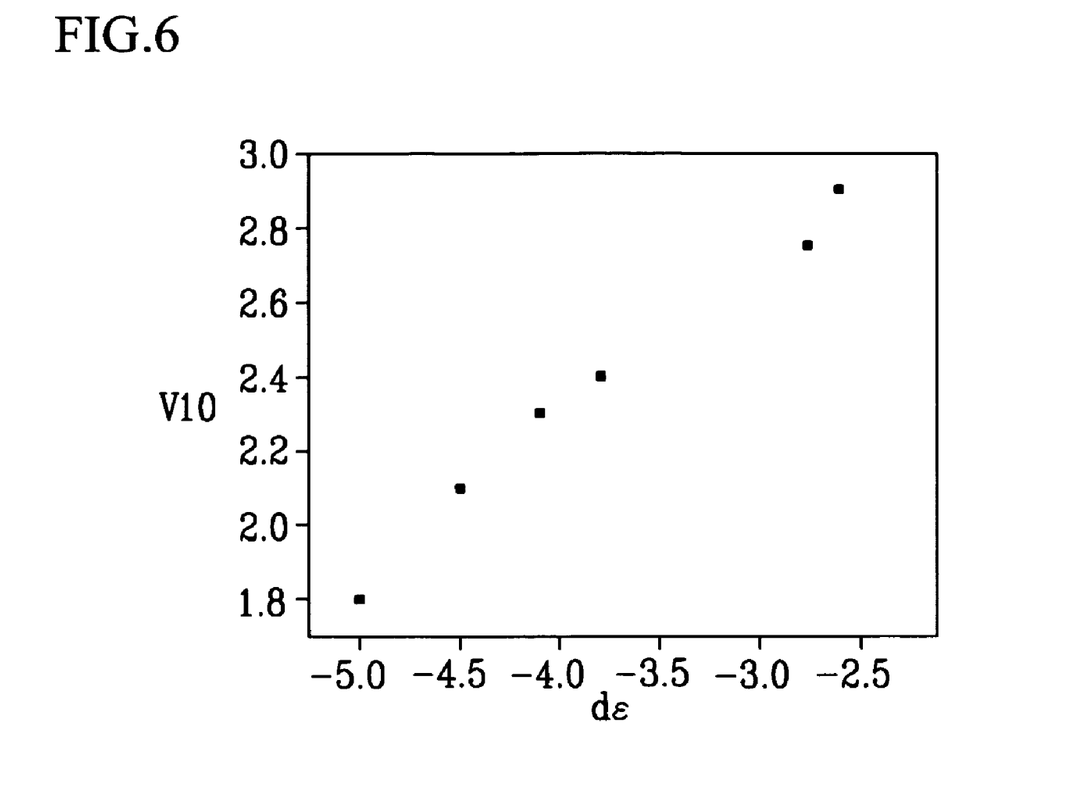
FIG. 6 is a graph showing a V10 voltage as function of the dielectric anisotropy of liquid crystal materials.

As shown in FIG. 6, the larger the absolute value of the dielectric anisotropy becomes (that is, as goes from curve 4 to curve 1), the lower the V10 voltage becomes. The V10 voltage for LC4 is in a range of about 2.4V to about 2.5V, while the V10 voltage for low voltage driving with 9V or less AVdd is preferably lower than that for LC4 by about 0.5V. Enduring a little transmittance reduction, the V10 voltage smaller than that of LC4 by about 0.3V, i.e., the V10 voltage equal to or lower than 2.2 V enables the low voltage driving with 9V AVdd. FIG. 6 indicates that the dielectric anisotropy $\Delta\in$ equal to or lower than $-4.5$ makes the V10 voltage to be 2.2V or less, and thus, it is suitable for the low voltage driving. However, when the dielectric anisotropy $\Delta\in$ becomes less than $-5.5$, the responsive speed becomes slow and afterimages are outstanding due to the extreme increase of the viscosity of the liquid crystal. Considering the compensation of the driving voltages to an extent by adjusting other cell variables such as cell gap, elastic coefficient of the liquid crystal, refractive anisotropy of the liquid crystal, the range of the dielectric anisotropy $\Delta\in$ suitable for the low voltage driving is enlarged to $-5.5$ to $-4.0$.

Figure 7:
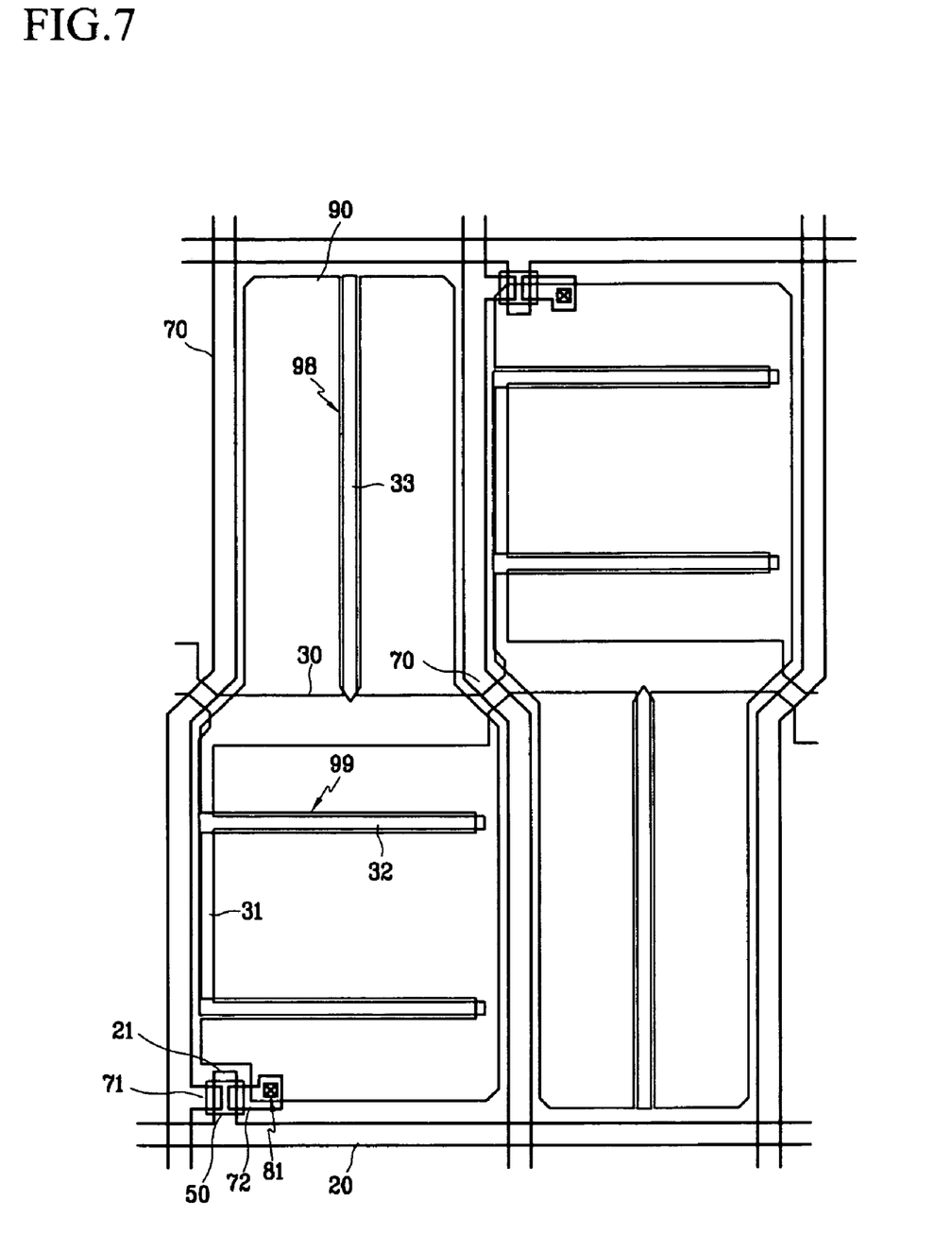
FIG. 7 is a layout view of a TFT array panel for an LCD according to a second embodiment of the present invention.
Figure 8:
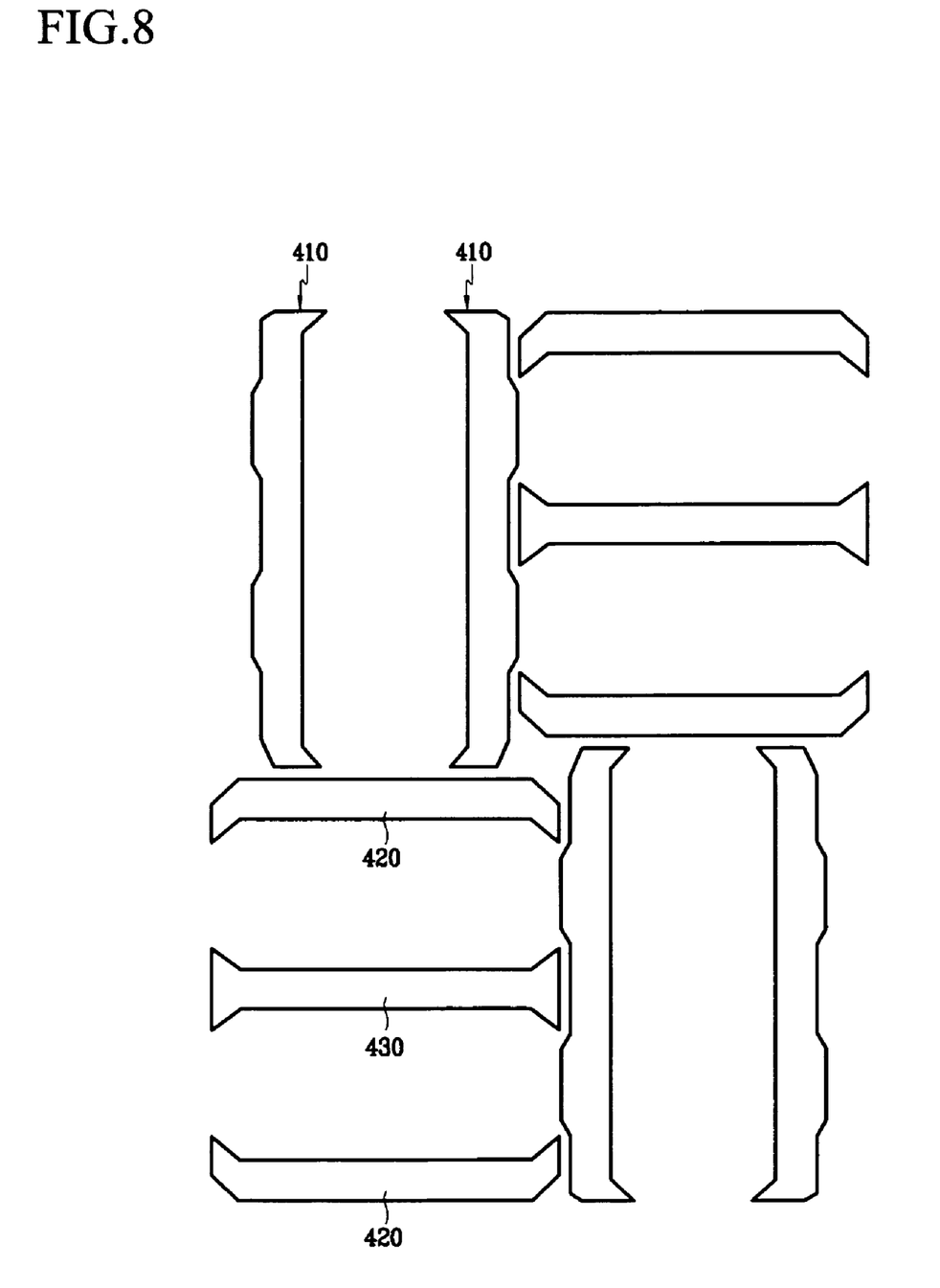
FIG. 8 is a layout view of apertures provided at a common electrode of an CD according to the second embodiment of the present invention.
Figure 9:
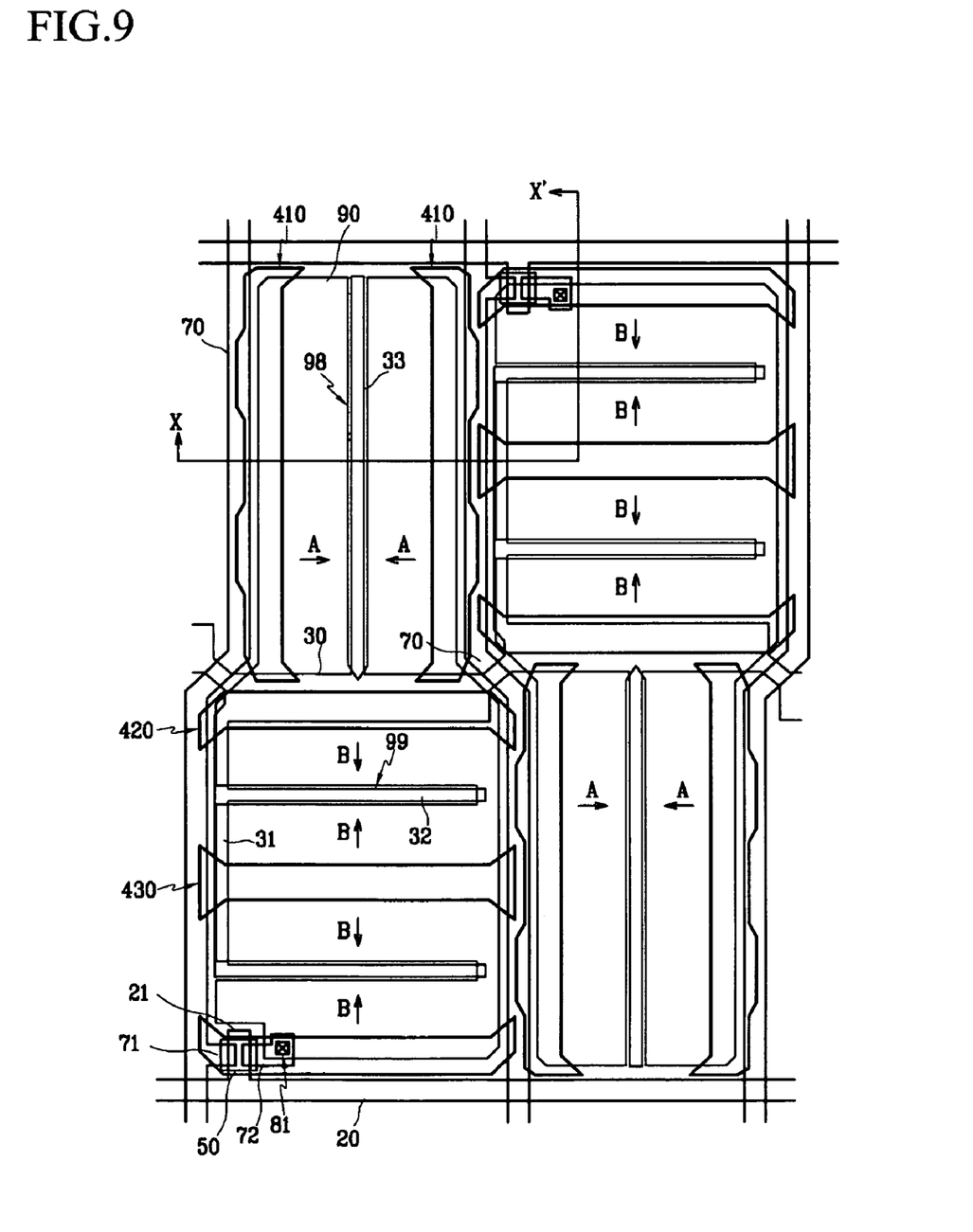
FIG. 9 is a front layout view of a pixel electrode and a common electrode of an LCD according to the second embodiment of the present invention.
Figure 10:
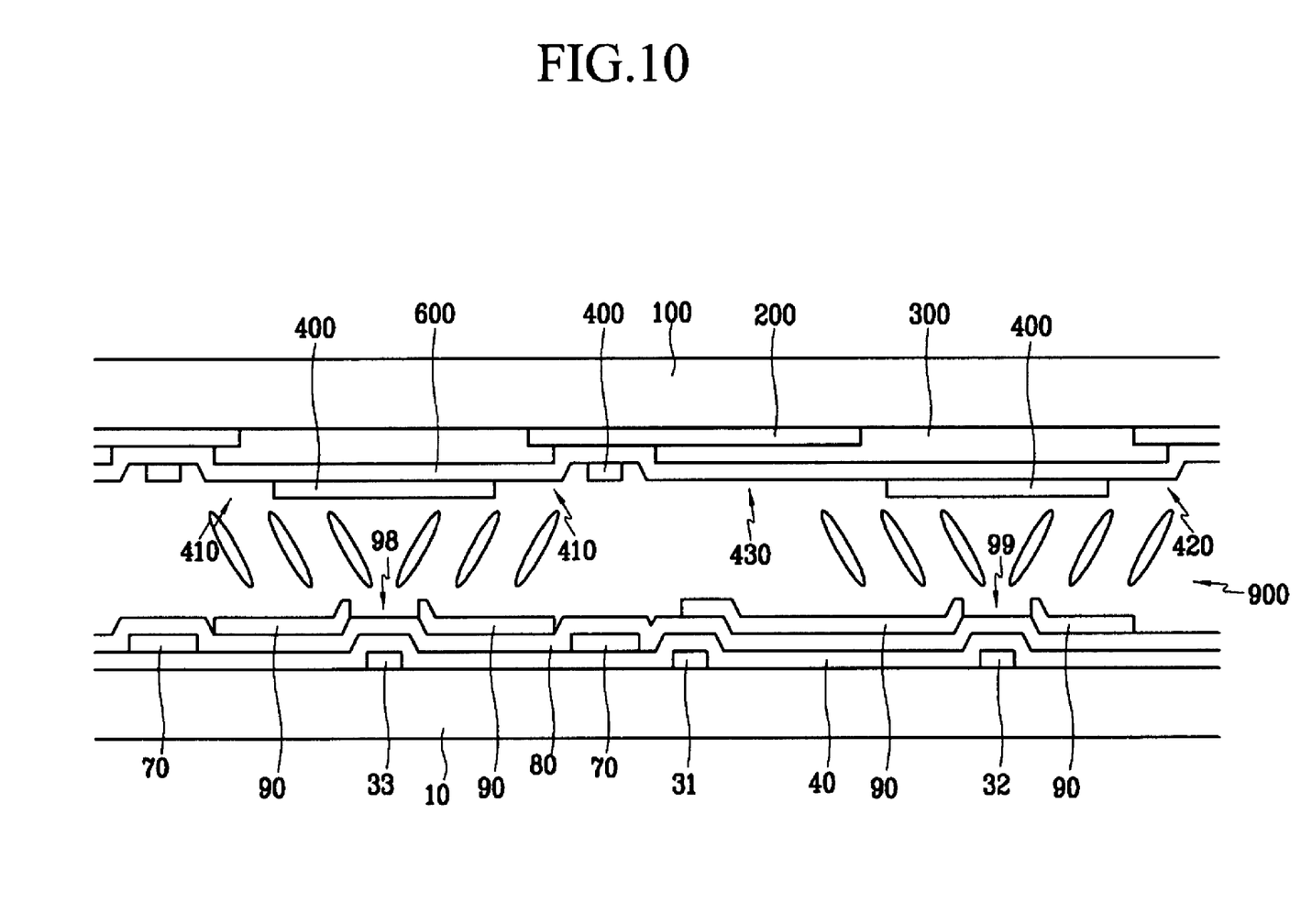
FIG. 10 is a sectional view taken along line X-X' shown in FIG. 9.

FIG. 7 is a layout view of a TFT array panel for an LCD according to a second embodiment of the present invention, FIG. 8 is a layout view of apertures provided at a common electrode of an LCD according to the second embodiment of the present invention, and FIG. 9 is a front layout view of a pixel electrode and a common electrode of an LCD according to the second embodiment of the present invention. FIG. 10 is a sectional view taken along the line X-X' shown in FIG. 9.

First, a TFT allay panel will be described with reference to FIGS. 8 and 10.

A plurality of gate lines 20 extending in a transverse direction and a plurality of storage capacitor lines 30 extending in substantially the same direction as the gate lines 20 are formed on an insulating substrate 10, and a plurality of gate electrodes 21 are projected form each gate line 20. In this embodiment, the storage capacitor lines 30 are not exactly rectilinear. In detail, each storage capacitor line 30 includes a plurality of transverse bars with relatively large widths aligned along an imaginary straight line extending in the transverse direction such that the bars are a little longitudinally deviated from the imaginary line, and a plurality of connections with relatively small widths connecting the bars. A plurality of pairs of first and second branch electrodes 33 and 31 extending in a longitudinal direction are connected to the respective storage capacitor lines 20, and a plurality of third branch electrodes 32 extending in the transverse direction are connected to the respective second branch electrodes 31.

A gate insulating layer 40 are formed on the gate lines 20 and the storage capacitor wire 30-32.

A semiconductor layer 50 preferably made of hydrogenated amorphous silicon is formed on the gate-insulating layer 40. The semiconductor layer 50 overlaps the gate electrodes 21.

A contact layer (not shown) preferably made of n+ hydrogenated amorphous silicon heavily doped with n type impurity is formed on the semiconductor layer 50. The contact layer includes a plurality of a pair of portions, and the portions in each pair are separated from each other and opposite with respect to the gate electrode 21.

A data wire 70-72 is formed on the contact layer. A plurality of data lines 70 extend in the longitudinal direction and placed on the gate insulating layer 40. The data lines 70 are not exactly rectilinear. In detail, each data line 70 includes a plurality of longitudinal bars aligned along an imaginary straight line extending in the longitudinal direction such that the bars are a little transversely deviated from the imaginary line, and a plurality of connections connecting the bars. The deviated distances between the bars are adjusted in consideration of the occupation ratio of transversely long subareas and longitudinally long subareas. The deviation directions of two adjacent data lines 70 are opposite each other, and thus the areas disposed between the opposite bars of the adjacent data lines 70 are arranged such that relatively narrow areas and relatively wide areas alternate both in the transverse direction and in the longitudinal direction. The data lines 70 intersect the storage capacitor lines 30 and the gate lines 20, and, in this embodiment, the data lines 70 and the storage capacitor lines 30 intersect through their corrections.

A passivation layer 80 is formed on the data lines 70.

On the passivation layer 80, a plurality of pixel electrodes 90 preferably made of ITO or IZO are formed in respective pixel areas defined by the intersections of two adjacent gate lines 20 and two adjacent data lines 70. The pixel electrodes 90 are connected to respective drain electrodes 72 via respective contact holes 141. Each pixel electrode 90 has a relatively narrow portion and a relatively wide portion like the pixel area. A first aperture 98 extending in the longitudinal direction is provided at the narrow portion, while two second apertures 99 extending in the transverse direction are provided at the wide portion. The first aperture 98 bisects the narrow portion of the pixel electrode 90 in the transverse direction, while the second apertures 99 trisect the wide portion into three partitions arranged in the longitudinal direction. The intermediate partition among the three partitions of the wide portion has width at least two times as large as the other two partitions. The first aperture 98 overlaps the first branch electrode 33 of the storage capacitor line 30, while the second apertures 99 overlap the third branch electrode 32.

Next, an upper panel opposite to the TFT array panel will be described with reference to FIG. 8 and FIG. 10.

A black matrix 200 is formed on an insulating substrate 100, and a plurality of red, green and blue color filters 300 are formed on the black matrix 200. An overcoat 600 is formed on the color filters 300 and a common electrode 400 preferably made of a transparent conducting material such as ITO or IZO are formed on the overcoat 600. A plurality of sets of third to fifth apertures are provided in the common electrode 400 and arranged in a pattern shown in FIG. 8. In detail, the third apertures 410 extend in the longitudinal direction, while the fourth apertures 420 and the fifth aperture 430 extend in the transverse direction. The fourth and the fifth apertures 420 and 430 are disposed left and right to the third apertures 410, and the fifth aperture 430 is disposed between the two fourth apertures 420. In addition, the boundaries of the third apertures 410 adjacent to the fourth and the fifth apertures 420 and 430 are curved to be separated from the ends of the fourth and the fifth apertures 420 and 430.

Now, an LCD according to the second embodiment of the present invention will be described with reference to FIGS. 9 and 10.

An LCD according to the second embodiment of the present invention is manufactured by aligning a TFT array panel 10 and an upper panel 100 with a predetermined gap and injecting and sealing liquid crystal material into the gap. The liquid crystal molecules contained in the liquid crystal material are aligned so that the director thereof is perpendicular to the TFT array panel 10 and the color filter panel 100 in absence of electric field between the pixel electrodes 90 and the common electrode 400.

The dielectric anisotropy $\Delta \in$ of the liquid crystal material 900 has a value in a range between −4.0 to −5.5, and it is much preferable that the values of the dielectric anisotropy $\Delta \in$ ranges −4.5 to −5.5 since a V10 voltage (which indicates a voltage making the transmittance to be 10% of the maximum transmittance) can be decreased to 2.2V or lower.

The layouts of the wires, the pixel electrodes and the apertures after combining the TFT array panel 10 and the upper panel 100 will be described.

The third apertures 410 overlap left and right edges of the narrow portion of the pixel electrode 90, and the fourth apertures 420 overlap the upper and lower boundaries of the wide portion of the pixel electrode 90. The fifth aperture 530 is disposed so as to bisect the wide portion of the pixel electrode 90 into upper and lower halves. Therefore, the narrow portion of the pixel electrode 90 is partitioned into two subareas by the first aperture 98 and the third apertures 410, while the wide portion of the pixel electrode 90 is partitioned into four subareas by the second, the fourth and the fifth apertures 99, 420 and 430. Here, the widths of the subareas are preferably 20±5 microns, which are determined in consideration of the occupation ratio of the transversely long subareas B and the longitudinally long subareas A. Very narrow widths of the subareas decrease the aperture ratio, while very wide width causes the strength of the fringe field to be weak and thus makes the control of the tilt directions of the liquid crystal molecules to be difficult. The occupation ratio of the transversely long subareas B may be larger than that of longitudinally long subareas A. It is preferable that the transversely long subareas B occupy about 60% to about 90% of the entire pixel area.

The above described configuration of the pixel electrode 90 and the aperture patterns 98, 99, 410, 420 and 430 considerably increases the aperture ratio. The LCD according to an embodiment of the present invention exhibits the aperture ratio of 48%, which is obtained by modifying the shape of the pixel electrode 90 itself so as to adjust the widths of the transversely long subareas and transversely long subareas. Furthermore, most of the apertures 410-430 on the common electrode 400 are disposed at peripherals of the pixel areas originally blocked by the black matrix 200, thereby minimizing the decrease of the aperture ratio. That is, the third apertures 410 are disposed so as to overlap left and right edges of the narrow portion of the pixel electrode 90 and the fourth apertures 420 are disposed so as to overlap upper and lower boundaries of the wide portion of the pixel electrode 90, which are areas blocked by the black matrix so as to prevent the light-leakage at the boundaries between pixel areas or provided with the storage capacitor lines 30 for storage capacitance. Accordingly, the third and the fourth apertures 410 and 420 provided on these areas do not decrease the aperture ratio.

Furthermore, it is possible to increase the visibility by making the transversely long subareas B larger than the longitudinally long subareas A.

In addition, since all the subareas in the LCD according to the second embodiment of the present invention have rectangular shapes, it is advantageous in the view of both the response speed and minimization of texture near the corners of the subareas.

According to the present invention, an LCD can be driven with driving voltages lower than the conventional LCD by using a liquid crystal material having dielectric anisotropy in a range of −4.0 to −5.5. The V10 voltage (which indicates a voltage making the transmittance 10% of the maximum transmittance) can be reduced to 2.2V or lower by using a liquid crystal material having the dielectric anisotropy in a range between −4.5 and −5.5. Accordingly, cheap low voltage driving ICs can be used instead of expensive high voltage driving ICs.

What is claimed is:

1. A liquid crystal display comprising:
a first insulating substrate;
a plurality of first signal lines formed on the first insulating substrate;
a plurality of second signal lines formed on the first insulating substrate and insulated from and intersecting the first signal lines;
a thin film transistor connected to one of the first signal lines, one of the second signal lines;
a pixel electrode coupled to the thin film transistor;
a second insulating substrate opposite to the first insulating substrate;
a common electrode formed on the second insulating substrate; and
a liquid crystal material interposed between the first insulating substrate and the second insulating substrate, wherein liquid crystal molecules contained in the liquid crystal material are aligned substantially perpendicular to the first and the second substrates in absence of electric field between the pixel electrode and the common electrode, and dielectric anisotropy of the liquid crystal material is in a range of less than −4.6 to −5.5, wherein a voltage difference of about 2.2V applied between the pixel electrode and the common electrode makes a transmission of the liquid crystal display equal to or greater than about 10% of a transmittance obtained by applying a voltage difference of about 4.5V between the pixel electrode and the common electrode.

2. The liquid crystal display of claim 1, wherein the dielectric anisotropy of the liquid crystal material is in a range of less than −4.6 to −5.0.

3. The liquid crystal display of claim 1, further comprising:
a first domain partitioning member formed on one of the first insulating substrate and the second insulating substrate; and
a second domain partitioning member formed on one of the first insulating substrate and the second insulating substrate,
wherein the first and the second domain partitioning members partition the pixel area into a plurality of domains.

4. The liquid crystal display of claim 3, wherein the first domain partitioning member includes an aperture pattern provided at the pixel electrode and the second domain partitioning member includes a dielectric projection provided on the second insulating substrate.

5. The liquid crystal display of claim 3, wherein the first domain partitioning member and the second domain partitioning member include aperture patterns provided on the pixel electrode and the common electrode, respectively.

6. The liquid crystal display of claim 3, wherein the domains partitioned by the first and the second domain partitioning members are classified into longitudinally long domains and transversely long domains with respect to the first signal lines, and the transversely long domains occupy areas larger than the longitudinally long domains.

7. The liquid crystal display of claim 3, further comprising a first polarizer and a second polarizer wherein the first and second insulating substrates are disposed between the first polarizer and the second polarizer and the polarizing axes of the first and second polarizers make an angle of about 45 degrees with long sides of the domains.

* * * * *